United States Patent
Thigpen et al.

(10) Patent No.: US 8,977,896 B1
(45) Date of Patent: Mar. 10, 2015

(54) MAINTAINING DATA INTEGRITY IN DATA MIGRATION OPERATIONS USING PER-MIGRATION DEVICE ERROR FLAGS

(71) Applicant: EMC Corporation, Hopkinton, MA (US)

(72) Inventors: Edward L. Thigpen, Raleigh, NC (US); Michael E. Bappe, Loveland, CO (US)

(73) Assignee: EMC Corporation, Hopkinton, MA (US)

( * ) Notice: Subject to any disclaimer, the term of this patent is extended or adjusted under 35 U.S.C. 154(b) by 181 days.

(21) Appl. No.: 13/853,291

(22) Filed: Mar. 29, 2013

Related U.S. Application Data

(60) Provisional application No. 61/779,313, filed on Mar. 13, 2013.

(51) Int. Cl.
*G06F 11/00* (2006.01)
*G06F 11/07* (2006.01)

(52) U.S. Cl.
CPC .................................. *G06F 11/0793* (2013.01)
USPC ............................................. 714/15; 714/6.3

(58) Field of Classification Search
USPC .............. 714/15, 16, 21, 3, 6.1, 6.11, 42
See application file for complete search history.

(56) References Cited

U.S. PATENT DOCUMENTS

| | | | |
|---|---|---|---|
| 7,770,053 B1 | 8/2010 | Bappe et al. | |
| 7,844,973 B1 * | 11/2010 | Dice | 718/108 |
| 8,370,592 B1 * | 2/2013 | Specht et al. | 711/162 |
| 2003/0187860 A1 * | 10/2003 | Holland | 707/100 |
| 2004/0044890 A1 * | 3/2004 | Lim et al. | 713/2 |

* cited by examiner

*Primary Examiner* — Dieu-Minh Le
(74) *Attorney, Agent, or Firm* — BainwoodHuang

(57) ABSTRACT

A data migration operation uses an error flag to protect against data corruption. During write cloning states, the error flag is set and only allowed state transitions are performed, including a non-error transition to a committed state when no device fault is recorded for a target storage device and an error transition to a setup state when a device fault is recorded for the target storage device. In a clean system shutdown, a shutdown procedure records a detected target storage device fault and clears the error flag; the recorded device fault later forces the error transition of the migration operation. During the system startup, if the error flag is set then a target storage device fault is recorded to likewise later force the error transition of the migration operation, on the assumption that a detected fault may exist but be unrecorded because the shutdown procedure did not complete during shutdown.

18 Claims, 12 Drawing Sheets

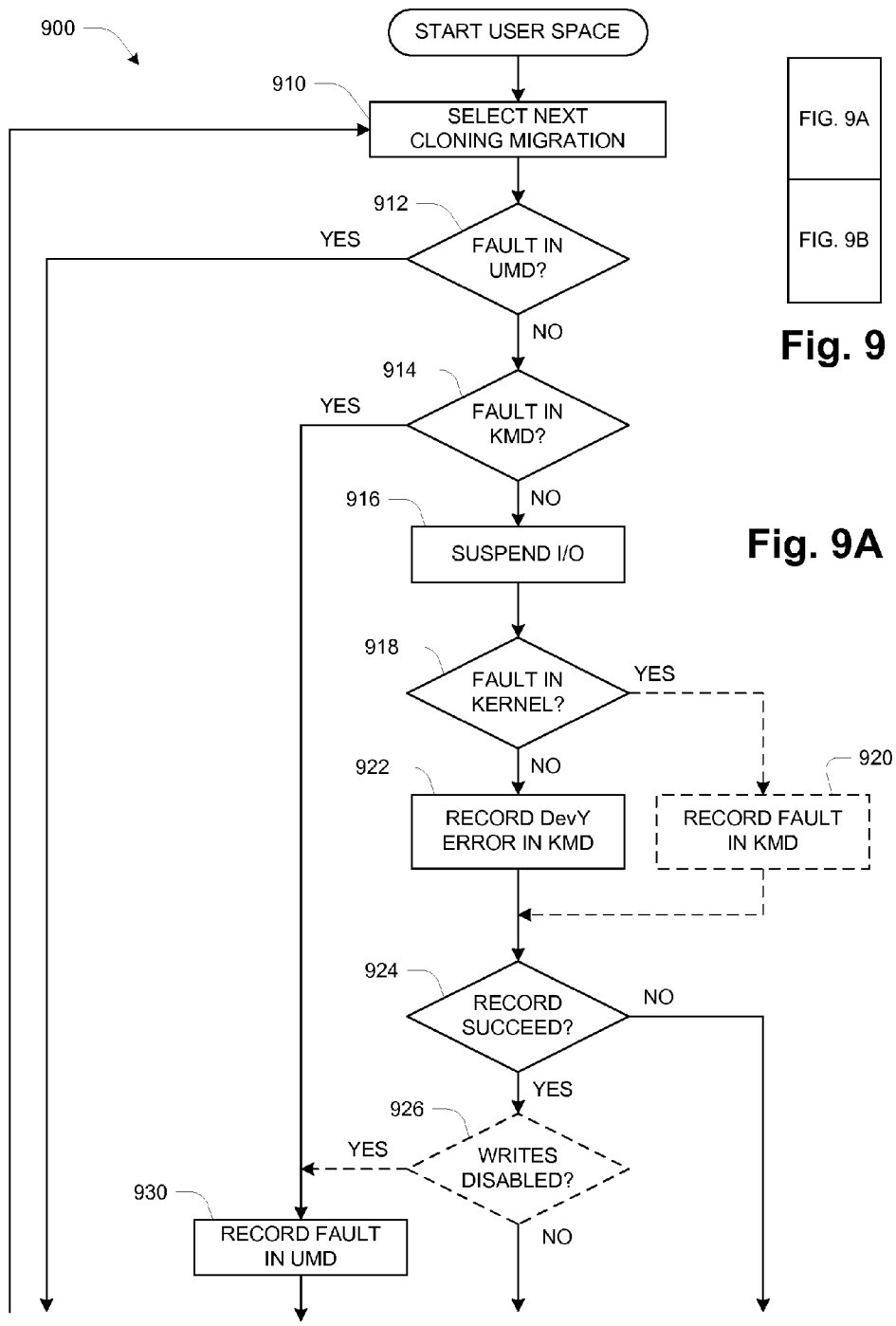

MAINTAINING DATA INTEGRITY IN DATA MIGRATION OPERATIONS USING PER-MIGRATION DEVICE ERROR FLAGS

BACKGROUND

The present invention generally relates to the field of data migration.

Many computer systems include one or more host computers, and one or more storage systems that store data used by the host computers. The storage systems typically include a plurality of disk drives and a plurality of disk controllers that respectively control access to the disk drives. A plurality of storage bus directors control communication with a host computer over communication buses. Each storage system further includes a cache to provide improved storage system performance. In particular, when the host computer executes a read from one of the storage systems, the storage system may service the read from its cache (when the data is stored in the cache) rather than from one of the disk drives, to execute the read more efficiently. Similarly, when the host computer executes a write to one of the storage systems, corresponding storage bus directors can execute the write to the cache. Thereafter, the data can be de-staged asynchronously in a manner that is transparent to the host computer to the appropriate one of the disk drives. Finally, storage systems include internal buses over which storage bus directors, disk controllers, and caches communicate.

The host computer may include a processor and one or more host bus adapters that each controls communication between the processor and one of the storage systems via a corresponding one of the communication buses. It should be appreciated that rather than a single processor, a host computer can include multiple processors. Each bus can be any of a number of different types of communication links, with the host bus adapter and storage bus directors being adapted to communicate using an appropriate protocol via the communication buses coupled there between. For example, each of the communication buses may be implemented as a SCSI bus with the storage bus directors and adapters each being a SCSI driver. Alternatively, communication between the host computer and the storage systems may be performed over a Fibre Channel fabric.

Typically, the storage systems make storage resources available to the host computer for assignment to entities therein, such as a file system, a database manager, or a logical volume manager. If the storage systems are so-called "dumb" storage systems, the storage resources that are made available to the host computer will correspond in a one-to-one relationship to physical storage devices within the storage systems. However, when the storage systems are intelligent storage systems, they will present logical units of storage to the host computer that need not necessarily correspond in a one-to-one relationship to any physical storage devices within the storage system. Instead, the intelligent storage systems may map each logical unit of storage presented to the host across one or more physical storage devices.

Administrators of computer systems may want to migrate sets of logically related data, such as a database or file system, from one storage resource to another. One common reason for doing so is that data stored on a logical unit might grow at such a rate that it will soon exceed the capacity of a storage system. Other common reasons include an administrator's desire to move the data to a storage system with faster response time, to organize the data differently on the resource to facilitate faster access, to reconfigure disk striping for fault tolerance and/or performance purposes, or to optimize the location where the data is physically stored.

Data migrations are often complicated and problematic exercises. Administrators usually must take offline any applications executing on the host that use a source device. Depending on the size of the data, applications can be offline for lengthy periods, leading to a loss of productivity, and opportunity costs associated with not having the data available for important business functions. Migrations typically are manual efforts, and are therefore error-prone, costly, and labor-intensive.

Known data migration efforts involve the following four separate steps, requiring manual intervention between each: source discovery, target provisioning, data synchronization (i.e., movement), and reconfiguration to switch to target access.

The source discovery step identifies the physical locations (e.g., the storage system and logical unit) at which the data is stored. This step is typically performed manually. An example conventional method includes the use of spreadsheets to compile an inventory of file systems, database table spaces, and other data stored on individual storage volumes.

The target provisioning step identifies and configures the storage resources (typically logical units of storage presented by another storage system) to which the data will be moved. Conventionally, this step requires extensive manual intervention by, for example, database administrators and system administrators. This step may include making new logical units visible to one or more host computers, mapping file systems and/or table spaces on target logical units, configuring switches, configuring volumes for redundancy, and planning for more efficient physical data access. This step is typically very time-consuming and labor-intensive and, thus, expensive.

The synchronization step involves moving or copying the data from the source locations to the target locations. Various techniques have been used to perform this step, including employing a utility application running on one or more host computers to read the data from the source locations and write the data to the target locations. Alternatively, a mirroring facility, such as the SYMMETRIX Remote Data Facility (SRDF) available from EMC Corporation, Hopkinton, Mass., may be used to create mirrors between source and target volumes on different storage systems and to then synchronize them so that the storage systems themselves perform the copy. Other data copy tools available from EMC include OPEN REPLICATOR for SYMMETRIX data storage systems and SANCOPY for CLARIION data storage systems. Synchronization is often the most time consuming of the four steps and usually requires taking the applications that are accessing the data offline (i.e., refused access to the data) while the step is performed.

After the data has been moved or copied, the switch to target step typically involves reconfiguring the computer system so that applications using the data will recognize the target locations as the new storage location for the data. Again, this conventionally requires human intervention and may require rebooting of the host computer(s) that access the data.

U.S. Pat. No. 7,770,053 discloses techniques for a "non-disruptive" migration, i.e., a data migration carried out while normal application input/output to the storage resource being migrated is still in progress. In this context, one concern is the possibility of data corruption in various operating scenarios, specifically scenarios involving both device faults and system shutdown/startup cycles. The techniques of the '053 patent specifically provide for maintaining data integrity under certain operating scenarios when one or more non-disruptive migrations are in progress.

SUMMARY

In many cases, it is desirable that multiple migrations be occurring in a given computer system simultaneously. For example, during a so-called "technology refresh", many storage devices may be replaced at the same time and thus it is desired to quickly and efficiently migrate data from existing source devices to new target devices. In such cases as well as others, there may be good reasons for performing multiple migrations in parallel.

One feature of maintaining data integrity in the techniques of the '053 patent includes accounting for unrecorded device errors at a time of system shutdown, so that all active migrations can be reliably continued (without restarting) upon subsequent system startup without fear of data corruption occurring. Device faults must be accurately accounted for because they can affect the progression of migration(s). In the '053 patent, this accounting includes use of a "clean shutdown" flag indicating whether the faults for all active migrations have been accounted for. A set of migrations active when a shutdown occurs are only resumed if the clean shutdown flag is set when the system later restarts.

While the clean shutdown logic of the '053 patent maintains data integrity by preventing continuation of migrations in the event of a non-clean shutdown, it does so at the cost of ceasing all active migrations whenever even one migration has a problem during shutdown. This may be unnecessarily broad. As a general matter, only those migration(s) that have a problem during shutdown create a risk of data corruption. Migrations that have no problem during shutdown may be continued, and such continuation is desirable from an efficiency perspective—the results of successful operations are preferably preserved rather than discarded due to failure of unrelated operations. Resources can be more efficiently utilized by only requiring restart of a migration when it is actually necessary. Thus, it would be desirable to maintain data integrity in the presence of problems during shutdown without requiring that all (or some unnecessarily large number of) active migrations be stopped in the event of a small number (e.g., one) of problems during shutdown.

To address this goal, a technique is disclosed that employs per-migration indicators and logic to make more specific determinations of whether problems may have occurred that affect specific active migration(s). By these techniques, only those migrations clearly affected by a problem during shutdown need be terminated in the event of a system shutdown and restart, and other active migrations can be continued. This behavior can improve efficiency in many data migration use cases such as the one described above.

In particular, a method is disclosed of managing state transitions in a data migration operation, where the migration operation includes an initial setup state, a set of write cloning states in which a target storage device is becoming or is maintained synchronized with a source storage device, and a later committed state in which the target storage device is used to the exclusion of the source storage device, and where the set of write cloning states span a system shutdown/startup cycle.

The method includes, upon entering the write cloning states, setting an error flag used to protect against data corruption in the event of a non-clean system shutdown. The error flag is handled just like a device fault during system startup. During the write cloning states, only allowed state transitions are performed based on recorded device faults. The allowed state transitions include a non-error transition to the committed state when no device fault is recorded for the target storage device, and an error transition to the setup state when a device fault is recorded for the target storage device.

A clean system shutdown is characterized by completion of a shutdown procedure in which a device fault detected during writing to the target storage device is recorded and the error flag is cleared, wherein the recording of the device fault forces the error transition of the migration operation during subsequent operation after the system restarts. In the case of a non-clean shutdown, the shutdown procedure is not completed, in which case a device fault may have occurred but be unrecorded and therefore a risk of data corruption exists if the migration is continued. During subsequent system startup and prior to enabling application input/output to the target storage device, it is determined whether the error flag is set indicating that the shutdown procedure was not completed. If so, then a device fault is recorded for the target storage device to force the error transition of the migration operation during subsequent operation. In this situation a device fault may not have actually occurred, but that fact is unknown because of the failure of the shutdown procedure to complete. Thus the operation conservatively protects against data corruption in case a device fault occurred but was not recorded.

The error flag is a per-migration flag, i.e., each active migration has its own error flag, and the shutdown/startup logic is performed for each active migration. In the event that the shutdown procedure partially completes, it is possible after the system startup to continue those migrations whose error flags have been cleared and that have no recorded device faults. Thus, migration operations may be conducted with improved efficiency notwithstanding the occurrence of shutdown/startup cycles.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
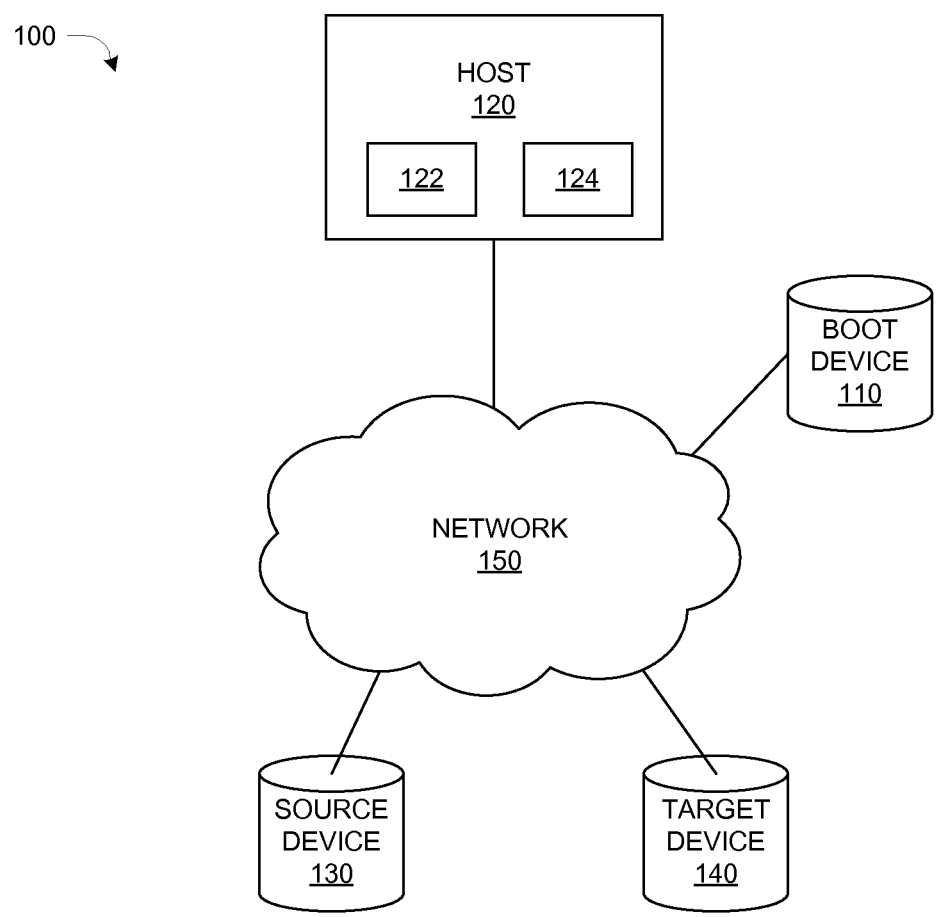
FIG. 1 is a block diagram of a data processing system.

The following detailed description refers to the accompanying drawings. Wherever possible, the same reference numbers are used in the drawings and the following description to refer to the same or similar parts. While several example embodiments and features are described herein, modifications, adaptations and other implementations are possible, without departing from the spirit and scope of the invention. For example, substitutions, additions or modifications may be made to the components illustrated in the drawings, and the example methods described herein may be modified by substituting, reordering, or adding steps to the disclosed methods. Accordingly, the following detailed description does not limit the invention. Instead, the scope of the invention is defined by the appended claims.

The disclosed methods and apparatus are intended for use in networks that include data storage systems, including those sold by EMC Corporation under the trademarks VNX®, VNXe®, and VMAX®. Furthermore, the methods and apparatus may take the form, at least partially, of program code (i.e., instructions) embodied in non-transitory tangible storage media, such as floppy diskettes, CD-ROMs, hard drives, random access or read only-memory, or any other non-transitory machine-readable storage medium. When the program code is loaded into and executed by a machine, such as a computer, the machine becomes an apparatus according to a disclosed embodiment. When implemented on a general-purpose processor, the program code combines with the processor to provide a unique apparatus that operates analogously to specific logic circuits. The program code (software-based logic) for carrying out the method is embodied as part of the system described below.

As used herein, the term "non-disruptive data migration" refers to a process in which data is migrated to a new data storage device without shutting down an application executing on a host that is reading data from, and writing data to, an existing data storage device. Since the migration is non-disruptive, an application executing on a host may continue to read data from a source device and write new data to the source device during the migration. Furthermore, during the migration, the source device and a target device must become synchronized. That is, the data on the source is copied to the target and any new data that is written by the application executing on the host to the source device is also written to the target device. At the completion of the migration, the target device is expected to store all of the data that was stored on the source device, including any data that was written to the source device after initiating the migration.

FIG. 1 is an example system for maintaining data integrity during a migration. FIG. 1 includes host 120, a boot device 110, a network 150, a source device 130, and a target device 140. Network 150 enables communication between host 120, boot device 110, source device 130, and target device 140. Alternatively, or in addition, boot device 110 may communicate directly with host 120. Network 150 may be, for example, a Fibre Channel fabric. Alternatively, network 150 may include, among other components, SCSI buses and SCSI drivers, for example.

Boot device 110 may be a device, such as a boot disk, boot drive, or boot chip, for example, for causing host 120 to execute boot processes (e.g., startup of host 120). As shown in FIG. 1, boot device 110 may communicate directly or indirectly with host 120. Alternatively, boot device 110 may be included in host 120.

Host 120 may be any type device for communicating with boot device 110, source device 130, and target device 140 over network 150. For example, host 120 may be a personal computer, handheld device, server, or any other appropriate computing platform or device capable of exchanging data with boot device 110 and/or network 150. Host 120 may include, for example, a processor 122, a memory 124, and one or more host bus adapters (not shown) to connect to network 150. Furthermore, host 120 may execute software for managing and/or monitoring a migration of data from source device 130 to target device 140. For example, memory 124 may provide functionality for allowing a user to transition between different states of a migration, such as source selected and/or target selected, during a migration. States and state transitions that may occur during migration are discussed below in further detail.

Source device 130 and target device 140 are available to host 120 via network 150. Source device 130 may store data for host 120. Target device 140 may be a target of a migration (i.e., during a migration, data from source device 130 is copied to target device 140). Each of devices 130 and 140 may include one or more disk drives (not shown), parts of one or more disk drives, or any other appropriate storage mechanism. For example, source device 130 may be a logical unit on a VMAX® storage system. Source device 130 and target device 140 may be the same or different kinds of storage devices. Furthermore, devices 130 and 140 may each be presented as a single logical unit.

Host 120 may use source device 130 to store data. Accordingly, data for host 120 stored on source device 130 may be migrated to target device 140. During a migration process, host 120 may store metadata describing the state and/or status of the migration in boot device 110. This metadata may be stored in the boot device 110, for example, as kernel metadata or user metadata. Kernel metadata and user metadata are discussed below in further detail with regard to FIG. 3. Storing kernel and/or user metadata may allow the migration to resume after a crash or a graceful shutdown of host 120. For example, in order to resume a migration smoothly after a crash of host 120, boot device 110 must be the first device host 120 accesses during a host boot process. Accordingly, host 120 may enable a kernel state of the migration process to be restored during a reboot.

One of skill in the art will appreciate that although one host, one boot device, and two storage devices are depicted in FIG. 1, any number of hosts, boot devices, and storage devices may be provided in system 100.

Figure 2:
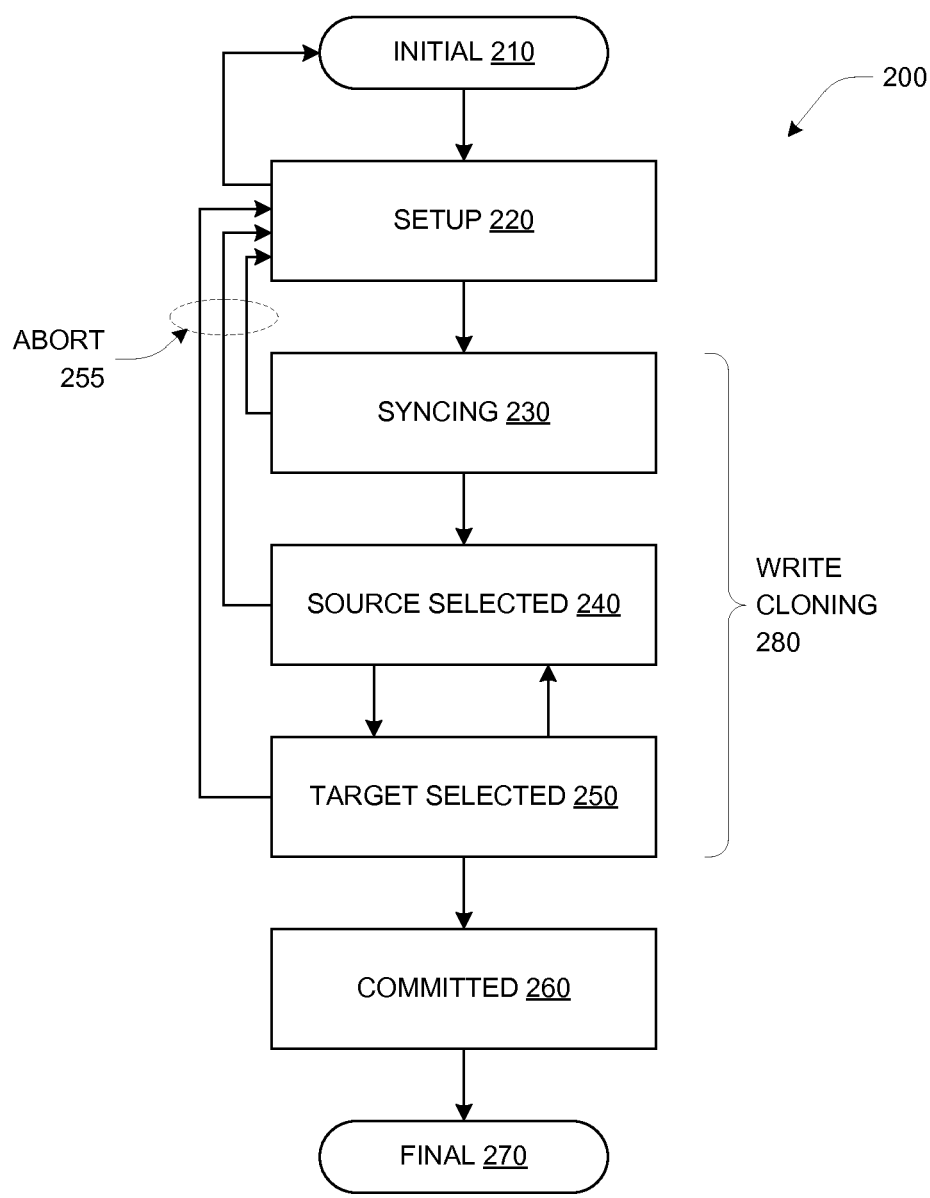
FIG. 2 is a flow diagram for a migration operation.

FIG. 2 is a diagram 200 of example states of a migration. During a migration, host 120 may control the migration through transitions between different stages that are referred to as "states." Changing from one state to another state is referred to as a "state transition" or "transition". As shown in FIG. 2, arrows represent possible state transitions that may occur during a migration.

Initial state 210 occurs prior to any migration operation. Setup state 220 is reached when a setup command, which is initiated by a user, initializes a migration operation. During the transition to setup state 220, all preparation that is required before synchronization of source device 130 and target device 140 is completed, including required validations, and any technology-specific setup steps. Furthermore, setup state 220 may also be reached as a result of aborting a migration as discussed below. From setup step 220, the user has the choice of continuing to a syncing state 230, or returning to the initial state 210, which eliminates the preparations that were made to reach setup state 220.

Syncing state 230 is reached when a sync command initiates a synchronization of a source device and a target device, such as source device 130 and target device 140. During the syncing state 230, data from source device 130 is copied to target device 140 and new writes to source device 130 are mirrored to both source device 130 and target device 140. This mirroring is also referred to as "cloning" herein. Once source device 130 and target device 140 are synchronized (i.e., both devices store the same data), syncing state 230 automatically transitions to a source selected state 240. However, automatic transition from the syncing state 230 to the source selected state 240 does not occur if there is a device write error while syncing, as discussed below in further detail.

In source selected state 240, the source and target devices are synchronized but the migration is not yet committed, and new writes continue to be mirrored to both source device 130 and target device 140. The migration may return to source selected state 240 when the user issues a command to select source device 130 when the migration is in a target selected state 250.

Target selected state 250 is reached when a select target command is issued by the user. New reads are retrieved from target device 140, while new writes continue to be mirrored to both source device 130 and target device 140. In target selected state 250, source device 130 and target device 140 continue to be kept synchronized, but the user has not committed to the migration.

The two arrows between the source selected state 240 and the target selected state 250 indicate that it may be possible to transition in either direction between these two states.

As indicated at 255, it is possible for a migration to be terminated or "aborted" during any of the syncing state 230, source selected state 240 and target selected state 250. In some cases this is done automatically, and it may also be done manually by the user issuing an "abort" command.

Committed state 260 is entered when the user issues a commit command while the migration is in the target selected state 250. A migration operation cannot be aborted from the committed state 260. The user may issue the commit command when the user is satisfied with the migration and wishes to transition operation to target device 140. Upon a successful transition to committed state 260, source device 130 is no longer kept synchronized with target device 140. Instead, the user has decided to permanently switch to target device 140.

Final state 270 is reached after a cleanup command. Before allowing access to the source device after a migration process, the cleanup command is used to remove any data or metadata from the source device that might cause OS or application confusion or errors.

The syncing state 230, source selected state 240 and target selected state 250 collectively form a set of "write cloning" states 280, i.e., states in which write cloning is being performed. This label is used for ease of reference below.

As discussed above, various commands may be issued by the user to transition from one state to another. For example, a "sync" command will transition a migration from setup state 220 to syncing state 230. When a system is in syncing state 230, upon completion of a copy-sweep of the data from a source device to a target device, the migration will automatically transition to source selected state 240. A "select target" command will transition the migration from source selected state 240 to target selected state 250. A "commit" command will transition the migration from target selected state 250 to committed state 260. Additional commands are available to the user, such as a "select source" command, that transitions the migration from target selected state 250 to source selected state 240, as represented by an arrow shown in FIG. 2. Furthermore, as mentioned above and shown by arrows in FIG. 2, a transition may be made from any of the write cloning states 280 back to setup state 220. Such a transition back to setup state 220 constitutes an abort 255 of the migration.

Figure 3:
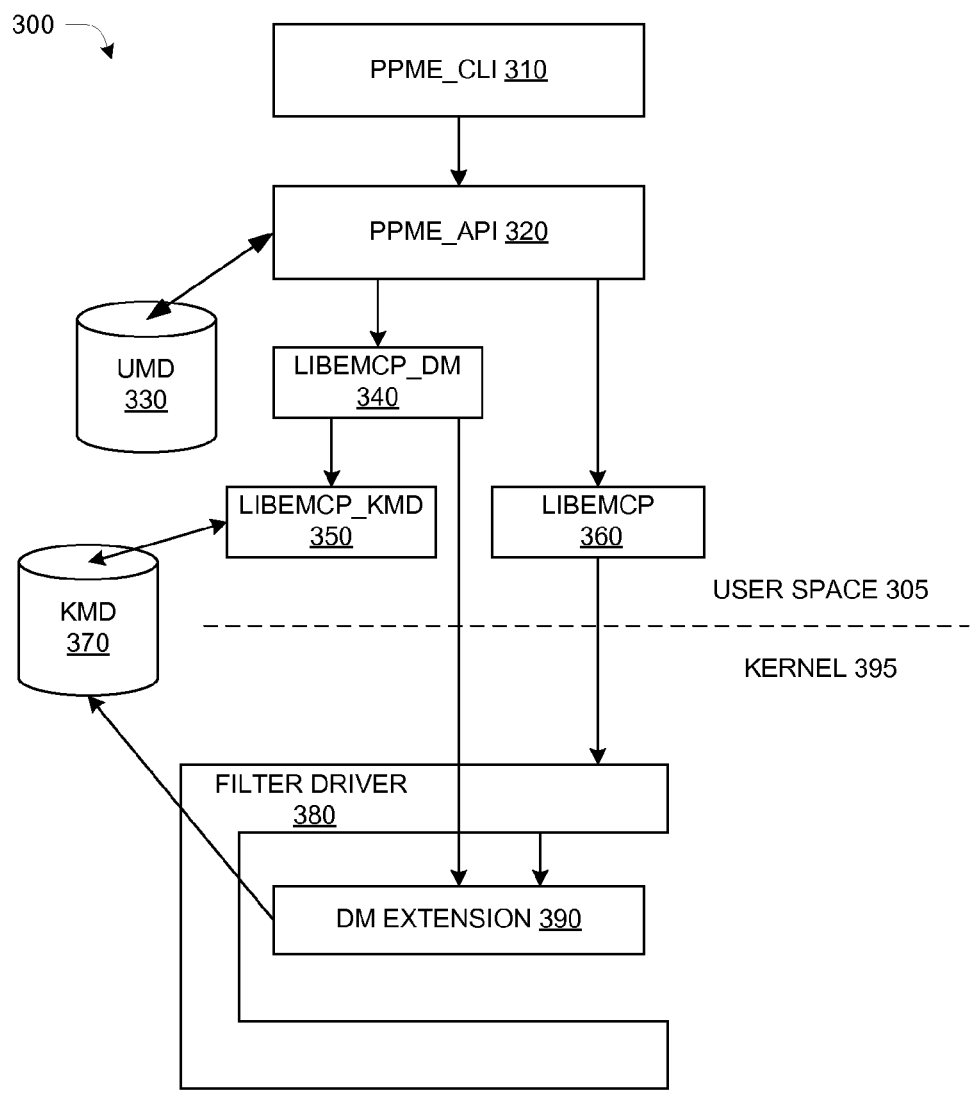
FIG. 3 is a block diagram of migration components executing in a host computer.

FIG. 3 is an example organization or architecture 300 of a non-disruptive migration enabler. Architecture 300 may be implemented as, for example, part of a specialized storage filter driver known as POWERPATH® sold by EMC Corporation. Further, portions of architecture 300 may be stored, for example, in memory 124 of host 120 and/or in boot device 110. Architecture 300 includes PPME_CLI interface 310, PPME_API 320, user metadata (UMD) 330, LIBEMC_DM interface 340, LIBEMCP_KMD 350, LIBEMCP 360, kernel metadata (KMD) 370, filter driver 380, and a data migration (DM) extension 390. An operating system (not shown) may separate available system memory into a kernel 395 and user space 305. As shown in FIG. 3, kernel 395 includes filter driver 380, and DM extension 390. Furthermore, kernel metadata 370 is accessible by kernel 395. User space 305 includes PPME_CLI interface 310, PPME_API 320, user metadata 330, LIBEMCP_DM interface 340, LIBEMCP_KMD 350, LIBEMCP 360, and kernel metadata 370.

Kernel 395 may execute filter driver 380 and kernel extensions, such as DM extension 390. User space 305 is external to kernel 395 and may include a set of libraries provided by an operating system for performing input/output or otherwise interacting with kernel 395. Kernel 395 may provide abstraction layers for hardware, memory, processors, and input/output (I/O) and make these tools available to user space 305 through inter-process communication mechanisms and system calls. For example, user space code may recognize that DM extension 390 has recorded a fault prior to allowing a migration transition. Furthermore, when a fault would compromise data integrity on a selected side of a migration, no further input/output may be allowed by DM extension 390 until the selected side of the migration is changed to the side of the migration that did not experience the fault.

As shown in FIG. 3, PPME_CLI interface 310 is a command interface to PPME_API 320. In other implementations, a web-based interface (not shown) may be included in addition to, or in alternative to, PPME_CLI interface 310. This is the interface by which the above-described user commands (Setup, Sync, etc.) may be received from an external user.

PPME_API 320 represents an implementation of an application program interface (API) that provides a set of routines in libraries for implementing a non-disruptive migration enabler. From a user interface displayed by host 120, the user may initiate a migration, as well issue commands to transition from migration states. For example, the user may issue a command to transition a migration from a target selected state to a source selected state. Furthermore, a user may issue any other command, as discussed above.

LIBEMCP_KMD 350 is a kernel metadata subsystem that is used to maintain a kernel persistent state across shutdown/startup cycles, also referred to as "reboots".

LIBEMCP 360 records changes to support name swapping for migrations involving pseudonames.

LIBEMCP_DM interface 340 is a user space library interface to DM extension 390.

Metadata is used to record states of active migration sessions and allow for recovery in the event of system and/or process crashes. User metadata (UMD) 330 stores metadata used and understood by PPME_API 320, and kernel metadata (KMD) 370 stores metadata needed to restore state in DM extension 390. User metadata 330 and kernel metadata 370 may be implemented using embedded databases, for example.

User metadata 330 may store a record for every migration source/target pair that is currently active. Each record may include data that is used to track the state of the migration, from setup to cleanup, and may include fields such as when a state change is about to occur, when the migration record is first updated to reflect the state being transitioned to, and the command being used to effect the transition. If the transition is interrupted, the command and state are used to determine what recovery action is needed. Once all transition steps are complete, the record stored in user metadata 330 may be updated to reflect the ending state, and that no command is in progress.

Kernel metadata 370 stores metadata used by kernel 395. Kernel metadata 370 may be used to restore a kernel state at reboot and/or reload time so that steps in a migration are reliably recovered and so that user data is not compromised. For example, kernel metadata 370 may indicate whether the source or the target is currently the selected side of the migration. Kernel metadata 370 may also store data indicating whether or not the last shutdown of a host was a clean shutdown.

Filter driver 380 may be included in an I/O stack. The above-mentioned POWERPATH product is an example of an I/O filter driver. In the example embodiment illustrated in FIG. 3, DM extension 390 is included to provide extended functionality for the filter driver 380, namely data migration (DM) related functionality. Filter driver 380, which may interact with an operating system (not shown), may conceptually be considered to be placed between the operating system and at least one host bus adapter (not shown).

DM extension 390 is included in filter driver 380 and manages I/O requests during a data migration process. DM extension 390 may implement functionality for kernel 395 that is needed to support data migration, including I/O redirection, access control, and write cloning. For example, DM extension 390 may handle every write I/O and each write I/O during syncing state 230, source selected state 240, or target selected state 250. In one situation, a write may be directed by host 120 to target device 140 and may be cloned to source device 130. In another situation, a write may be directed by host 120 to source device 130 and may be cloned to target device 140. Furthermore, although shown as one extension, DM extension 390 may include a plurality of extensions. Additional details concerning an I/O filter driver are disclosed in U.S. patent application Ser. No. 11/536,995, filed Sep. 29, 2006, which is entitled "Methods And Systems For Managing I/O Requests to Minimize Disruption Required for Data Migration," and which is hereby incorporated by reference.

When DM extension 390 detects a fault, DM extension 390 ceases to perform I/O that could exacerbate the problem and records the fault for handling by PPME_API 320. PPME_API 320 checks the fault state in DM extension 390 prior to any state-changing action. For example, when write cloning is on and one side of a cloned write fails, DM extension 390 records a fault for the failure. If the fault is due to the original write, an error is returned. If the fault is due to the cloned write, success is returned. A fault on the original write will also cause "error returning behavior." That is, error returning behavior causes all I/Os to return errors. Such behavior is required to preserve the integrity of the data on the cloned side of a migration until the user initiates an appropriate state change. The state change will also cause the error returning behavior to be cleared. Once an error is recorded, any subsequent writes are no longer cloned. The error condition is kept until either write cloning is turned off by PPME_API 320 or host 120 is rebooted.

DM extension 390 records and acts upon the first fault it encounters during a migration. Subsequent faults may result in errors being returned, but no other action is taken in DM extension 390. DM extension 390 also implements special behavior after a crash. After a crash, DM extension 390 will engage in error returning behavior for any device for which write cloning is turned on. This behavior may be cleared by PPME_API 320 once recovery processing is complete and all migrations are in a safe state. DM extension 390 may also implement special behavior when rebooting after a clean shutdown, as discussed below.

Further, DM extension 390 includes functionality for detecting device write errors while a migration is in the syncing, source selected, or target selected states. Detection of device write errors is discussed below. Certain transitions may be prevented following detection of a fault.

Table 1 provides a summary of example "fault states" that may be detected and recorded.

| Current State | Source Fault | Target Fault | Host Crash | Reported Fault State | Error Returning Behavior |
|---|---|---|---|---|---|
| Setup | X | | | N/A | |
| | | X | | N/A | |
| | | | X | N/A | |
| Syncing | X | | | Source Fault | YES |
| | | X | | Target Fault | |
| | | | X | Target Fault | |
| Source Sel'd | X | | | Source Fault | YES |
| | | X | | Target Fault | |
| | | | X | Target Fault | |
| Target Sel'd | X | | | Source Fault | YES |
| | | X | | Target Fault | |
| | | | X | Source Fault | |
| Committed | X | | | N/A | |
| | | X | | N/A | |
| | | | X | N/A | |

As shown in Table 1, faults are reported when a source failure, target failure, or host crash occurs. Furthermore, faults are only reported when the current state of a migration is one of syncing, source selected, or target selected and when write cloning is in use. An actual source fault is mirrored as a reported source fault state, and likewise an actual target fault is mirrored as a reported target fault state. However, for a host crash the reported state differs depending on the state of the migration. When the migration is in the syncing state 230 or the source selected state 240, a target fault is reported. When the migration is in the target selected state 250, a source fault is reported. This operation enables a migration to be completed rather than aborted under some circumstances, as explained more fully below.

Table 2 provides a summary of example transitions, which may be allowed during a migration when a particular fault state occurs.

| Current State | Fault State | Allowed Transitions | Reported Errors |
|---|---|---|---|
| Setup | N/A | Syncing (as normal) | Faults not detected in this state |
| Syncing | Source | Abort | Errors returned for all I/Os until transition made |
| | Target | Abort | |
| Source Sel'd | Source | Target Sel'd | Errors returned for all I/Os until transition made |
| Target Sel'd | Target | Abort | |
| | Source | Commit | |
| | Target | Abort | Errors returned for all I/Os until transition made |
| Committed | Source | All | New faults not detected, but may be in this state from fault occurring in preceding Target Sel'd |

-continued

| Current State | Fault State | Allowed Transitions | Reported Errors |
|---|---|---|---|
| | Target | N/A | This condition not possible in normal operation |

As shown in Table 2, certain transitions are allowed depending upon a recorded fault state and a current state of the migration. Furthermore, these restrictions on state transitions are imposed only when the current state is one of syncing 230, source selected 240, or target selected 250. By contrast, any one of the transitions shown in FIG. 2 may occur when there are no faults.

When the current state is the syncing state 230 and the recorded fault state is a "source fault" or a "target fault," then the only allowed transition is an abort command, which will return the migration to the setup state 220. When the current state is the source selected state 240 and the recorded fault state is a "source fault," then the only allowed transition is to the target selected state 250. When the current state is the target selected state 250 and the recorded fault state is a "source fault," then the only allowed transition to the committed state 260. When the current state is the target selected state 250 and the recorded fault state is a "target fault," then the only allowed transition is an abort command, which will return the migration to the setup state 220.

Figure 4A:
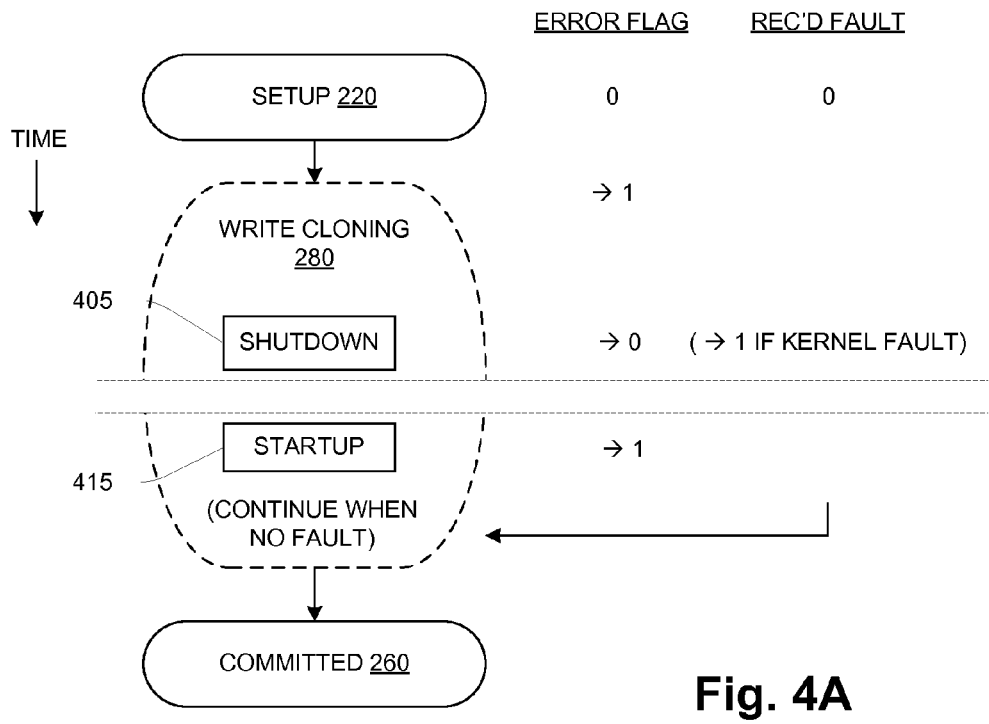
FIGS. 4A and 4B are simplified flow diagrams showing interruption of a migration operation by a system shutdown and startup.
Figure 4B:
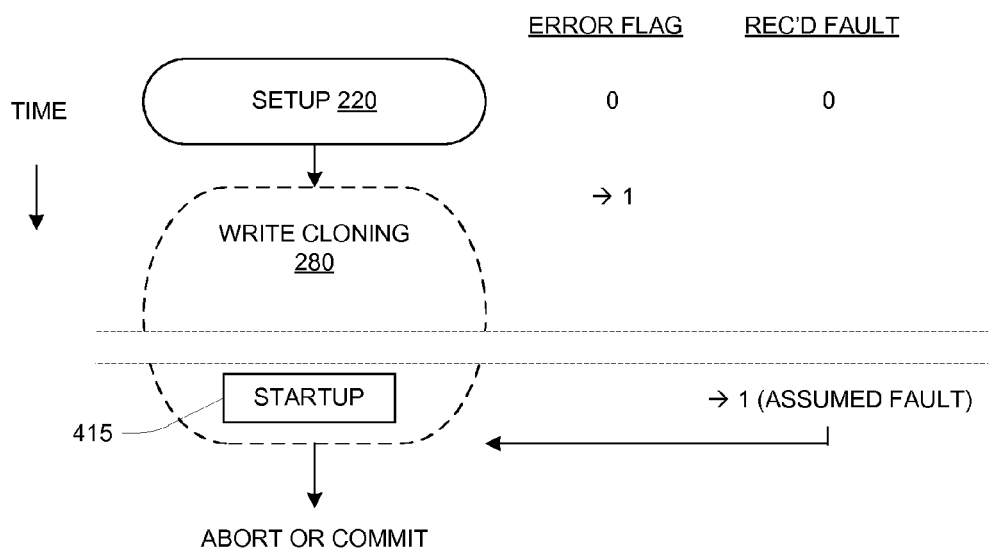

FIGS. 4A and 4B depict one aspect of operation at a high level, namely processing that occurs when an active migration is interrupted by a system shutdown and startup cycle, indicated by the pair of parallel dotted lines in each of these figures. FIG. 4A shows a first case referred to as a "clean" shutdown, while FIG. 4B shows an alternative "non-clean" shutdown. The basic difference is whether there is an opportunity for a shutdown procedure 405 to run before operation ceases. The shutdown procedure 405 is invoked automatically by the operating system when it is performing an orderly system shutdown, such as in response to a command of an administrative system user. Common cases for a non-clean shutdown are a sudden loss of operating power so that the system does not operate long enough to fully perform an orderly shutdown after detecting loss of power or a failure to perform some individual action required by the orderly shutdown due to a device or system error. The shutdown procedure 405 is either not invoked at all or does not complete its processing before operation completely ceases. In each case, the shutdown/startup occurs when a migration is one of the write cloning states 280, and the processing is directed to determining whether the migration can be continued safely or must be terminated because of the possibility of data corruption. The process employs indicators shown as ERROR FLAG and REC'D FAULT, the latter indicating whether or not a fault has been recorded for a device participating in the migration.

Referring to the clean shutdown case of FIG. 4A, upon the transition from Setup 220 to a write cloning state 280 (specifically to Sync'ing 230 as described above), the error flag is set to 1. It is assumed that no fault has occurred and thus none is recorded at that time. In operation, the error flag may also be re-set (i.e., again set to 1) upon a transition into the source selected state 240 and a transition into the target selected state 250. As explained in more detail below, the shutdown procedure 405 is responsible for recording any faults that may have occurred, so that after the system restarts the migration progresses accordingly. As described above, transitions among the states of a migration are limited when faults have occurred, and therefore it is important that the occurrence of faults be reliably recorded. At the time of a shutdown, the filter driver 380 may be aware of a device fault that has occurred, but this event may not have become known to the higher-level components such as PPME_API 320. Further, this fault information may be volatile and thus lost during the shutdown/startup cycle. Thus it is important that such fault information be recorded during a shutdown and that it is known if the information may not have been recorded, so that post-startup migration operation does not result in data corruption and improper system operation.

Thus in the clean shutdown case of FIG. 4A, the shutdown procedure 405 clears the error flag (sets it to 0) once it checks for and records any faults for a given migration. Specifically as shown, the recorded fault flag may be set to 1 at this time if the kernel (i.e., filter driver 380) is aware of a device fault. Otherwise it remains at 0. There is one error flag per active migration. The cleared state of the error flag serves as an indication to the startup procedure 415 that any detected faults have been recorded, and thus the value of the recorded fault flag can be reliably used in resuming operation. If a fault is recorded (indicated by a "1" value for the recorded fault flag), then the migration may be aborted or, in some cases, forced to the committed state 260—these scenarios are explained below. But if no fault is recorded (indicated by "0" for the recorded fault flag), the migration operation can by resumed as if the shutdown/startup did not occur, and eventually make the normal (unforced) transition to the committed state 260. As also shown the startup procedure 415 also re-sets the error flag for use in event of a subsequent shutdown/startup cycle.

FIG. 4B shows the non-clean shutdown case in which the shutdown procedure 405 is not performed. In this case the error flag is not cleared, being left in the "1" state indicating that the fault-recording function of the shutdown procedure 405 was not performed. The startup procedure 415 detects this state of the error flag and modifies startup operation accordingly. Write cloning is stopped, and the migration is forced to either abort or commit as explained in more detail below. Also, the startup procedure 415 sets the recorded fault indicator to 1 to cover the possibility that a non-recorded device fault occurred prior to shutdown. This is indicated as "assumed fault" in FIG. 4B. With recorded fault, the migration resumes differently.

The above approach is conservative from the perspective of preventing data corruption. It will be appreciated that in alternative embodiments other approaches may be taken. For example, the migration may be suspended while separate action is taken to more definitively ascertain whether a fault occurred prior to shutdown, so that the active migration can be resumed if possible. The type of approach used in any particular embodiment may be affected by the likelihood or prevalence of the shutdown/error scenario, the cost and difficulty of aborting and restarting a migration rather than resuming it, etc.

Figure 5:
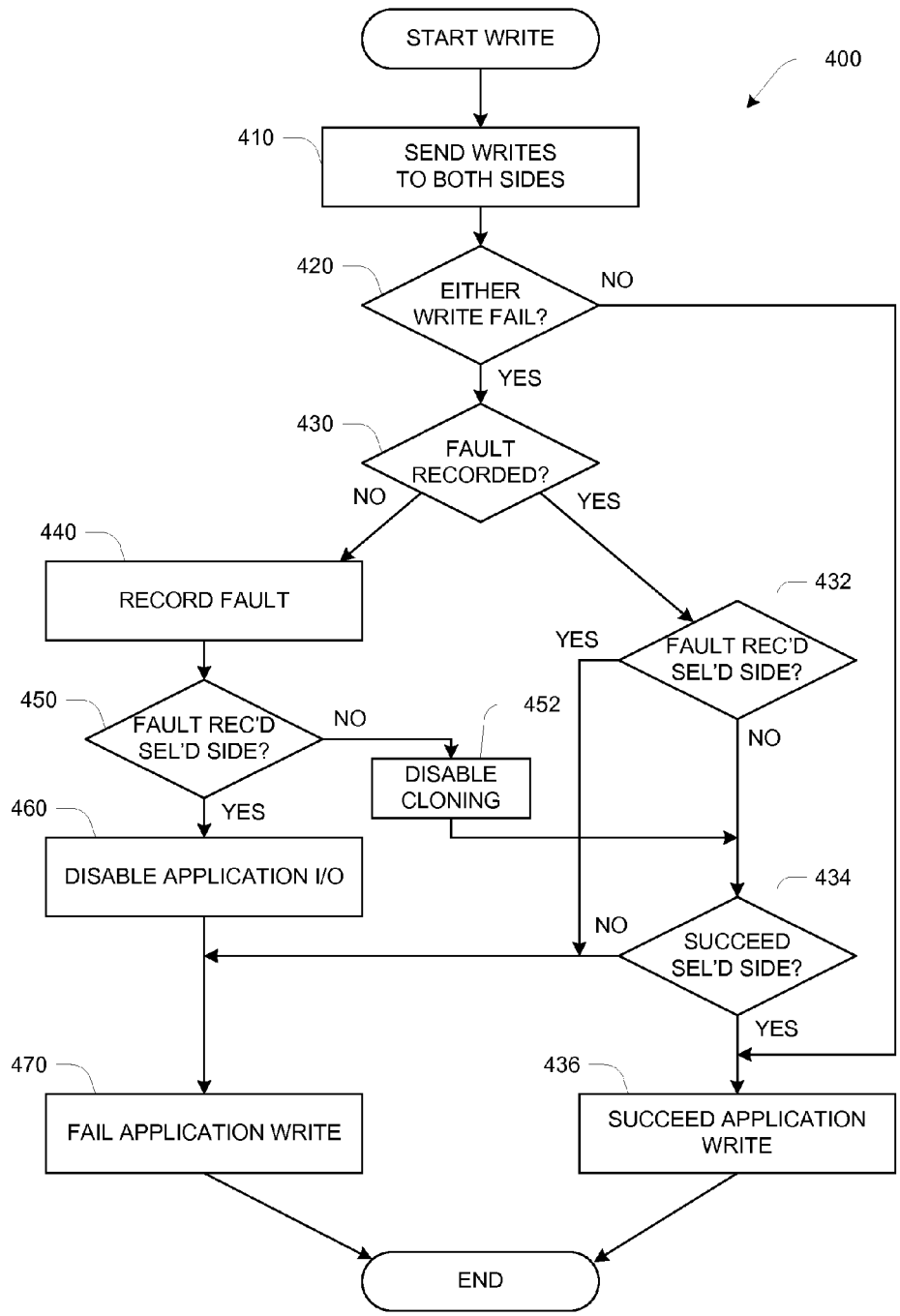
FIG. 5 is a flow diagram for kernel processing of writes.

FIG. 5 is a flow diagram of an example method 400 for handling device write errors in kernel 395. In step 410, in normal migration operation each write is sent to both sides of the migration. That is, a write from host 120 to source device 130 is transmitted to both source device 130 and target device 140. Next, in step 420, DM extension 390 determines whether either of the writes have failed. If a write to source device 130 or target device 140 has failed, then the process proceeds to step 430. If neither write failed, then the process proceeds to step 436. In step 436, the application write is succeeded and the process ends.

In step 430, when it has been determined that a write to one of devices 130 and 140 has failed, DM extension 390 determines whether a fault has already been recorded in runtime data structures (not shown) of DM extension 390. If a fault has already been recorded, then the process proceeds to step 432. If a fault has not already been recorded, then the process proceeds to step 440. Additional detail about the runtime data structures and their use is given below.

In step 432, when a fault has already been recorded, DM extension 390 determines whether the recorded fault is on the selected side of the migration (i.e., of the source device 130 when in source selected state 240, and of the target device 140 when in the target selected state 250). If the recorded fault is for the selected side of the migration, then the process proceeds to step 470. In step 470, the application write is failed and the process ends.

If in step 432 the recorded fault is not on the selected side of the migration, then the process proceeds to step 434. In step 434, DM extension 390 determines whether the application write on the selected side of the migration succeeded. If the application write on the selected side of the migration succeeded, then the process proceeds to step 436. In step 436, the application write is succeeded and the process ends. However, if the application write on the selected side of the migration did not succeed, then the process proceeds to step 470. In step 470, the application write is failed and the process ends.

On the "no" branch of test step 430, in step 440 a new fault is recorded in kernel 395 by DM extension 390. The process proceeds to step 450.

In step 450, DM extension 390 determines whether the recorded fault is on the selected side of the migration. If the recorded fault is not on the selected side of the migration, then the process proceeds to step 452. In step 452, write cloning is disabled in kernel 395 by DM extension 390, and the process proceeds to step 434, discussed above. If the recorded fault is on the selected side of the migration, then the process proceeds to step 460.

In step 460, application I/O is disabled and the process proceeds to step 470. In step 470, the application write is failed, and the process ends. Application I/O will remain disabled until the required transition, as indicated in Table 2, is performed by a user.

As described more below, in some cases cloning may be disabled or all application IO for the subject devices may be disabled when a write occurs. In the first case (cloning disabled) the write is sent only to the source device 130? If application IO is disabled due to a selected side fault being recorded in the data structures of the DM extension 390, the write is immediately failed and none of the processing of FIG. 5 occurs.

Figure 6:
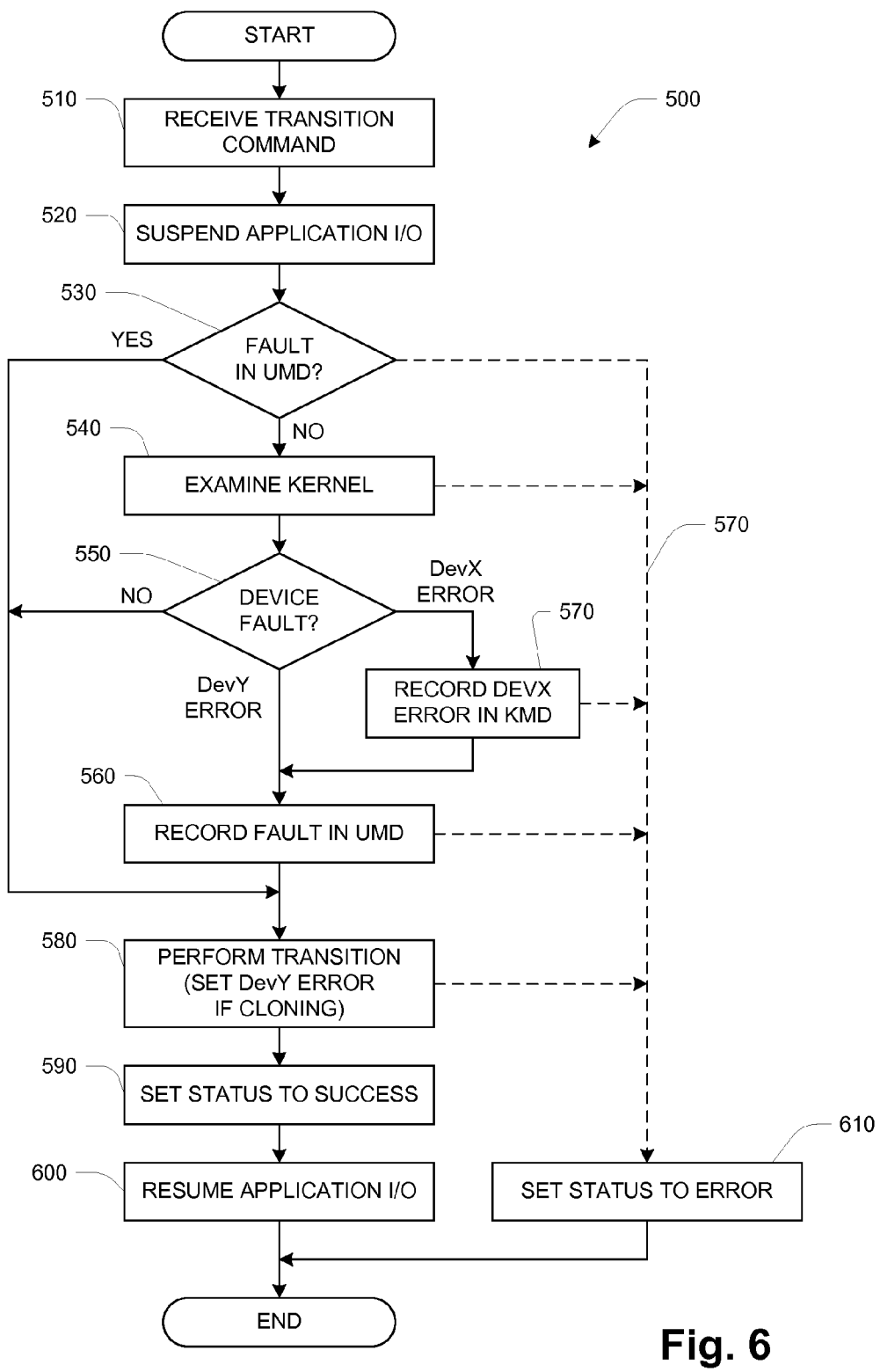
FIG. 6 is a flow diagram for migration state transitions.

FIG. 6 is a flow diagram of an example method 500 for handling state transitions in user space 305. Certain faults may indicate a loss of synchronization of source device 130 and target device 140. Accordingly, some state transitions shown in FIG. 2 are prevented after the detection of these faults. By preventing state transitions, the user may be required to return to a setup state in order to restart a migration due to a fault or the user may be forced to commit to the migration.

In step 510 of method 500, PPME_API 320 receives a command for a state transition, and the process proceeds to step 520. A transition command may be initiated by host 120 at the direction of a user or may occur automatically in certain instances. The command may indicate a transition from any one of the states previously discussed in connection with FIG. 2, such as from the setup state 220 to a syncing state 230, the syncing state 230 to the source selected state 240, the source selected state 240 to the target selected state 250, and the target selected state 250 to the committed state 260, for example.

In step 520, application I/O is suspended by host 120. That is, any new I/Os from the application are held temporarily until application I/O is resumed. Any I/Os that are already in progress are allowed to complete before proceeding to step 530.

In step 530, PPME_API 320 determines whether a fault is already recorded in user metadata (UMD) 330. If a fault is already recorded, then the process proceeds to step 580, discussed below. However, if a fault is not recorded, then the process proceeds to step 540.

In step 540, a kernel state stored by DM extension 390 is examined and the process proceeds to step 550.

In step 550, PPME_API 320 determines whether the kernel state examined in step 540 indicates that a fault has occurred for source device 130 or target device 140. There are three possible outcomes of this test: (1) No fault, (2) Fault on selected side (shown as DevX ERROR), and (3) Fault on non-selected side (shown as DevY ERROR). If a device fault has not been detected, then the process proceeds to step 580. If a DevY error has been detected, then the process proceeds to step 560, in which the DevY error is recorded in user metadata 330. If a DevX error has been detected, then the process proceeds to step 570, in which the DevX error is recorded in the kernel metadata 370, and then to step 560 where the DevX error is recorded in user metadata 330.

At step 580, the commanded transition is performed and, if the transition is into a write cloning state 280, the above-described error flag (shown as DevY ERROR, where "DevY" refers to the non-selected device of the migration) is set. Next, in step 590, the status is set to success and the process proceeds to step 600. In step 600, I/O is resumed and the process ends.

The above process occurs under normal circumstances. Also shown in FIG. 6 is an error path 610 that is taken when certain errors occur. In this case any remaining normal processing (as described above) is bypassed, the completion status is set to error, and the process ends. The error path 610 may be taken from steps 530, 540, 560, and 570 if the operation does complete properly. For example, step 530 requires reading the UMD 330, an operation that can fail under certain circumstances. If such a failure occurs, then the failure path 610 is taken. Similar conditional processing occurs in the other steps. At 580, the failure path 610 is taken if the commanded transition is not allowable according to the specifications of Table 2 above. Although in FIG. 5 the failure path 610 is shown as bypassing the resuming of I/O at 600, in general it is possible to resume I/O for all of the illustrated failure cases except from 580.

Figure 7A:
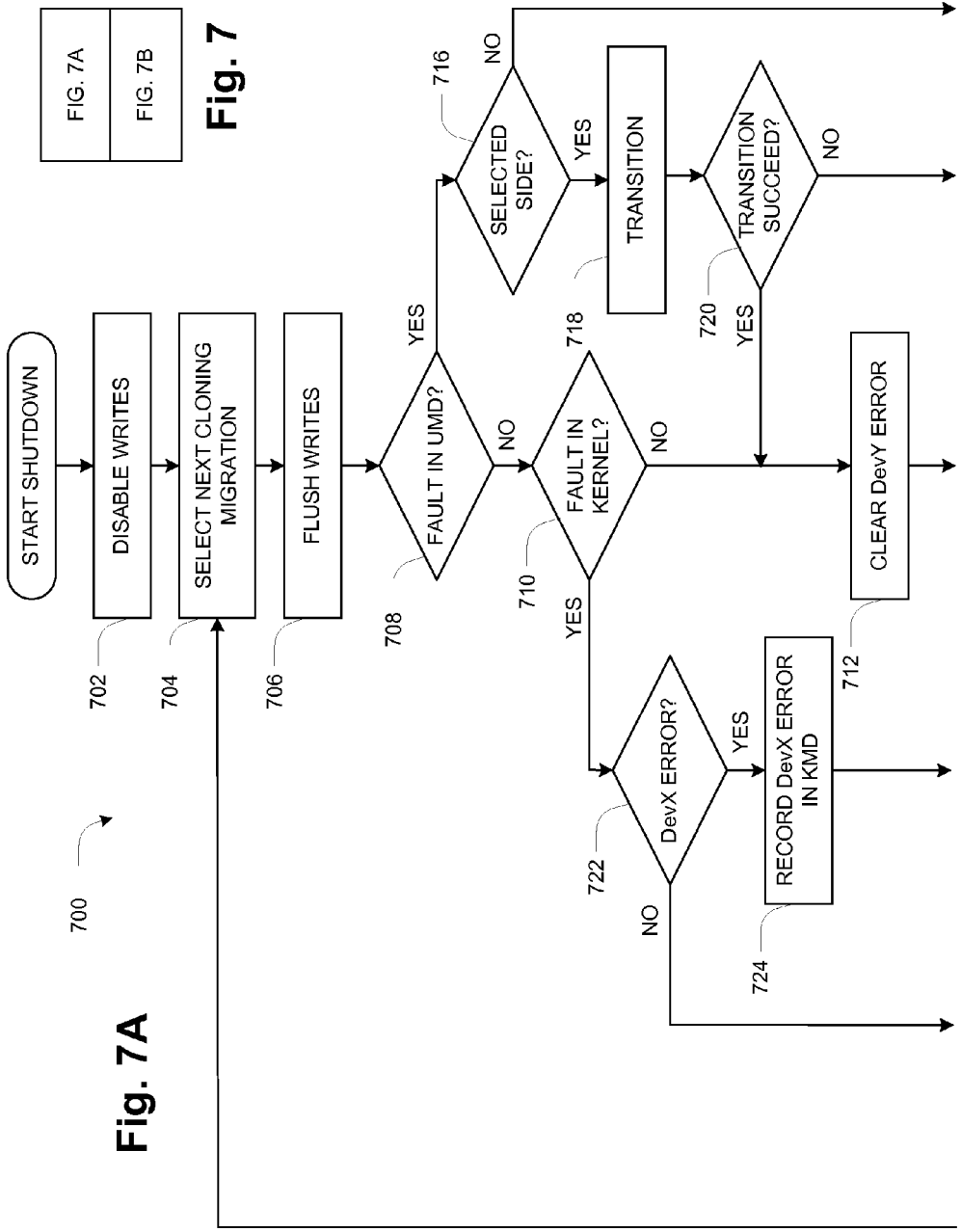
FIG. 7, consisting of views 7A and 7B, is a flow diagram for a user-space shutdown procedure.
Figure 7B:
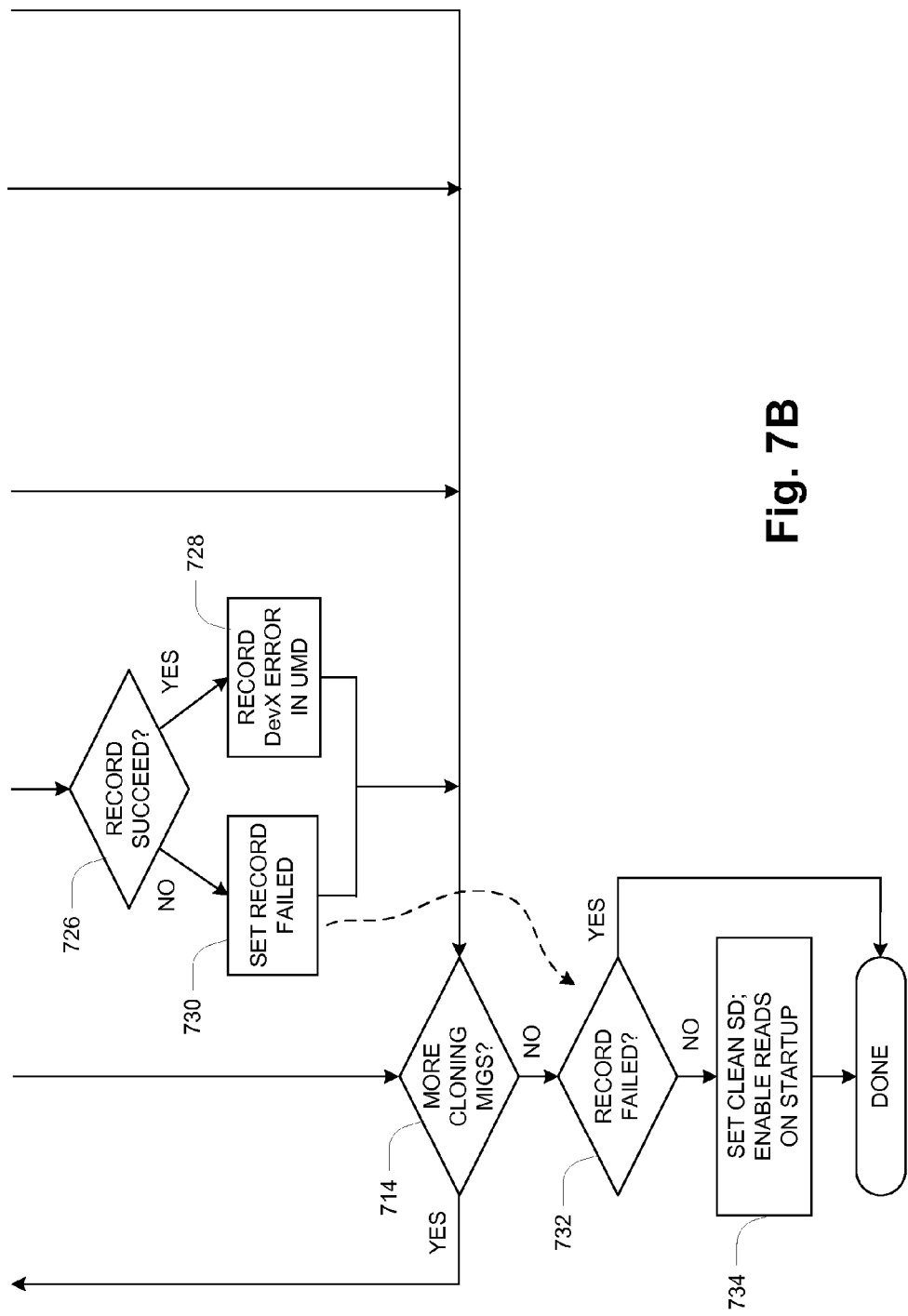

FIG. 7 is a flow diagram of an example method 700 in user space 305 for maintaining data integrity when a shutdown/startup cycle occurs. The method 700 is performed as part of the shutdown procedure 405 of FIG. 4A.

At 702, application writes are disabled. At 704, the next "cloning" migration is selected, i.e., the next migration in a cloning state 280. 704 is the beginning of a set of operations performed for each cloning migration. At 706, any pending application writes are "flushed", i.e., allowed to complete.

At 708, the UMD 330 is accessed to determine whether any faults for the devices involved in this migration have been recorded. If not, then at 710 the kernel is interrogated for any such device faults that it has detected (but has not yet recorded). If none, then at 712 the DevY ERROR flag is cleared, which as explained more below serves as an indication that the fault accounting for this migration has occurred and that the subsequent startup process 415 can rely on the state of the fault indicators in the UMD 330 and KMD 370. The process then proceeds to a test at 714 for more migrations, and if there are more to be processed then the process returns to 704 to begin processing for a next cloning migration.

Returning to the test at 708, if a fault is recorded in the UMD 330, then at 716 it is determined whether the fault is for the selected side. If not, then the processing for this migration is complete and it proceeds to the test at 714 for another migration to process. In this case, the DevY ERROR flag is not cleared for this migration, which will serve as an indication to the startup process 415 that this migration has an error state requiring that it be aborted.

If at 716 the recorded fault is for the selected side, then at 718 the migration is transitioned to the committed state if possible. This is discussed more below. At 720 is a test whether the transition was successful, and if so then the process joins the non-error path at step 712, clearing the DevY ERROR flag and completing the processing for this migration. Otherwise step 712 is not performed, leaving the DevY ERROR flag set.

Returning to step 710, if the kernel has detected a fault then at 722 it is determined whether the fault is a DevX error. If not (i.e., it is a DevY error), then processing for this migration is complete, and the recorded DevY error is left intact. If the recorded fault is a DevX error, then at 724 this error is recorded in the KMD 370. At 726 is a test whether the DevX error was successfully recorded in the KMD 730, and if so then at 728 the DevX error is also recorded in the UMD 330. Otherwise, at 730 a "record failed" flag is set, which will be used at a later time as described below (indicated by dashed line).

Once all migrations have been processed, the test at 714 fails and processing proceeds to 732 where the "record failed" flag is tested. This flag will be set if there has been a failure to record a DevX error in the KMD 370 for any migration (step 730). If this flag is clear, then at 734 a "clean shutdown" (CLEAN SD) flag is set and application reads are enabled for the subsequent startup 415. The clean shutdown flag is used at startup as described below. Otherwise these steps are not performed and the process just completes.

Referring again to 718, at this point it is known that the fault is for the selected side. In 716, if the fault is for the non-selected side then there is the option of going to 718 or skipping it. A non-selected-side fault allows/requires transition to setup (i.e., an abort) only when operating in the source selected state. When operating in the target selected state, then the allowed transition is commit. Occurrence of a fault on the selected side provides the option of going either way because all I/Os are failed until a decision is made. This is not possible for a fault on the non-selected side; in this case it can transition only to the selected side.

Figure 8:
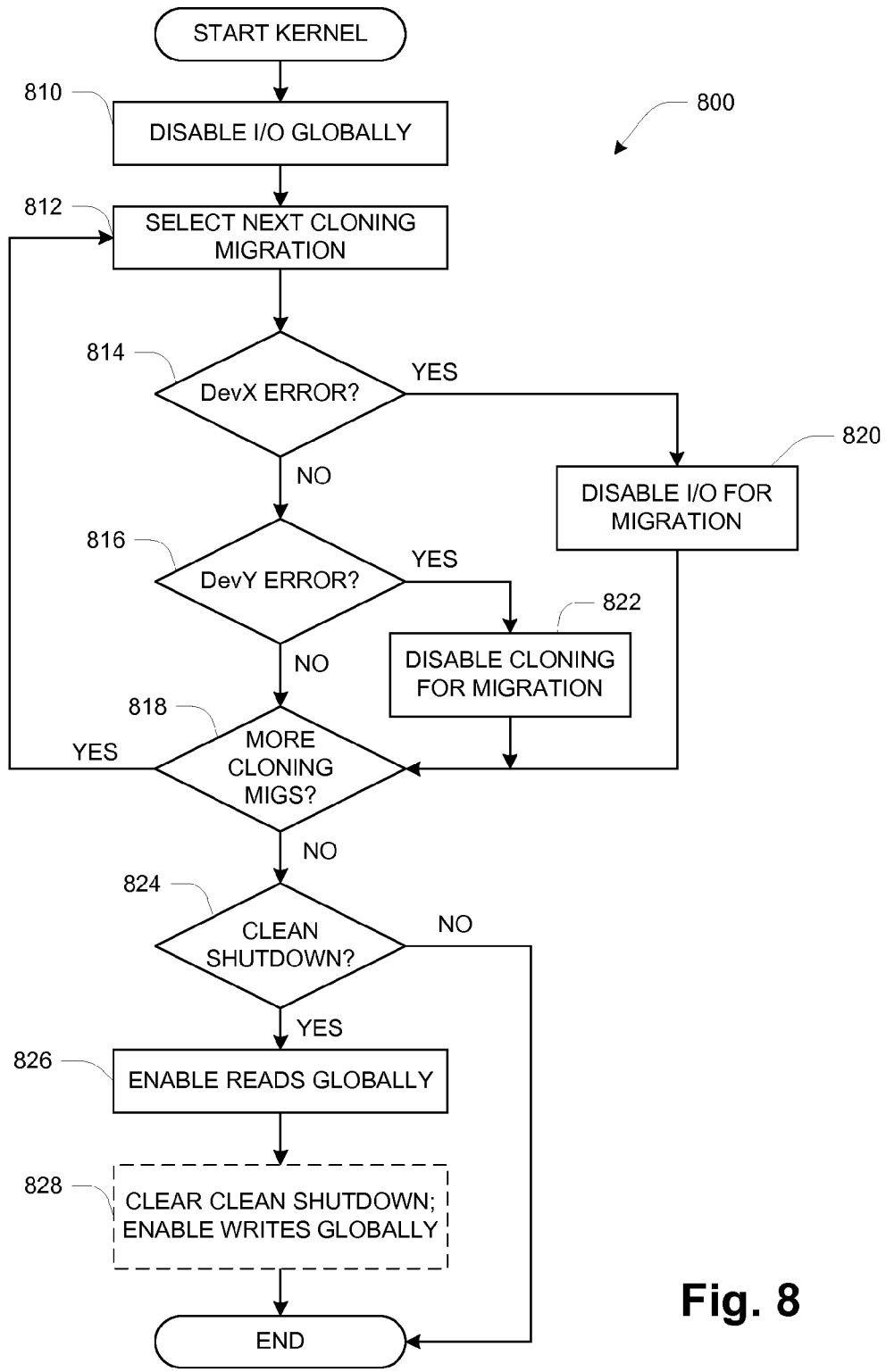
FIG. 8 is a flow diagram for a kernel startup procedure.

FIG. 8 is a flow diagram of an example method 800 in kernel 395 for maintaining data integrity after a host boot, specifically a process occurring upon boot. In step 810, I/O to source device 130 and target device 140 is disabled globally. At 812 the next cloning migration is selected. At 814, is a test for a DevX error, and if none is detected then at 816 is a test for a DevY error. If no DevY error is detected, then at 818 is a test for additional cloning migrations to process, and if there are any then the process loops back to 812 to repeat the processing for the next migration.

If at 814 a DevX error is detected, then at 820 I/O is disabled for this specific migration. This disabling is not affect by a subsequent global enabling that will allow non-errored migrations to continue, as described below. If at 816 a DevY error is detected, then at 822 cloning is disabled for this specific migration. This will stop the migration, but provide for continuing use of the currently selected device. After each of steps 820 and 822, processing proceeds to 818 to test for additional cloning migrations to be processed.

Once the test at 818 fails indicating all cloning migrations have been processed, then at 824 is a test of the clean shutdown flag, described above with reference to FIG. 7. If this flag is clear, indicating a non-clean shutdown, then the process ends. I/O is not been re-enabled, in order to avoid possible data corruption. It is left to some separate process to react to this condition at a system level, which may involve individually examining each device involved in an active migration to determine whether it remains in a usable (coherent) state for continued normal use, and to initiate appropriate action if not. If at 824 the clean shutdown flag is set, then at 826 application reads are enabled globally (which as indicated above will not override any migration-specific disabling that may have occurred at 820). On some systems, notably those using the Windows® operating system, it may be necessary to take other actions shown in the dashed box 828. These include clearing the clean shutdown flag and then enabling writes globally. It may be possible to clear clean shutdown from kernel which makes it possible to enable writes early; and it may be necessary to enable writes early.

Figure 9B:
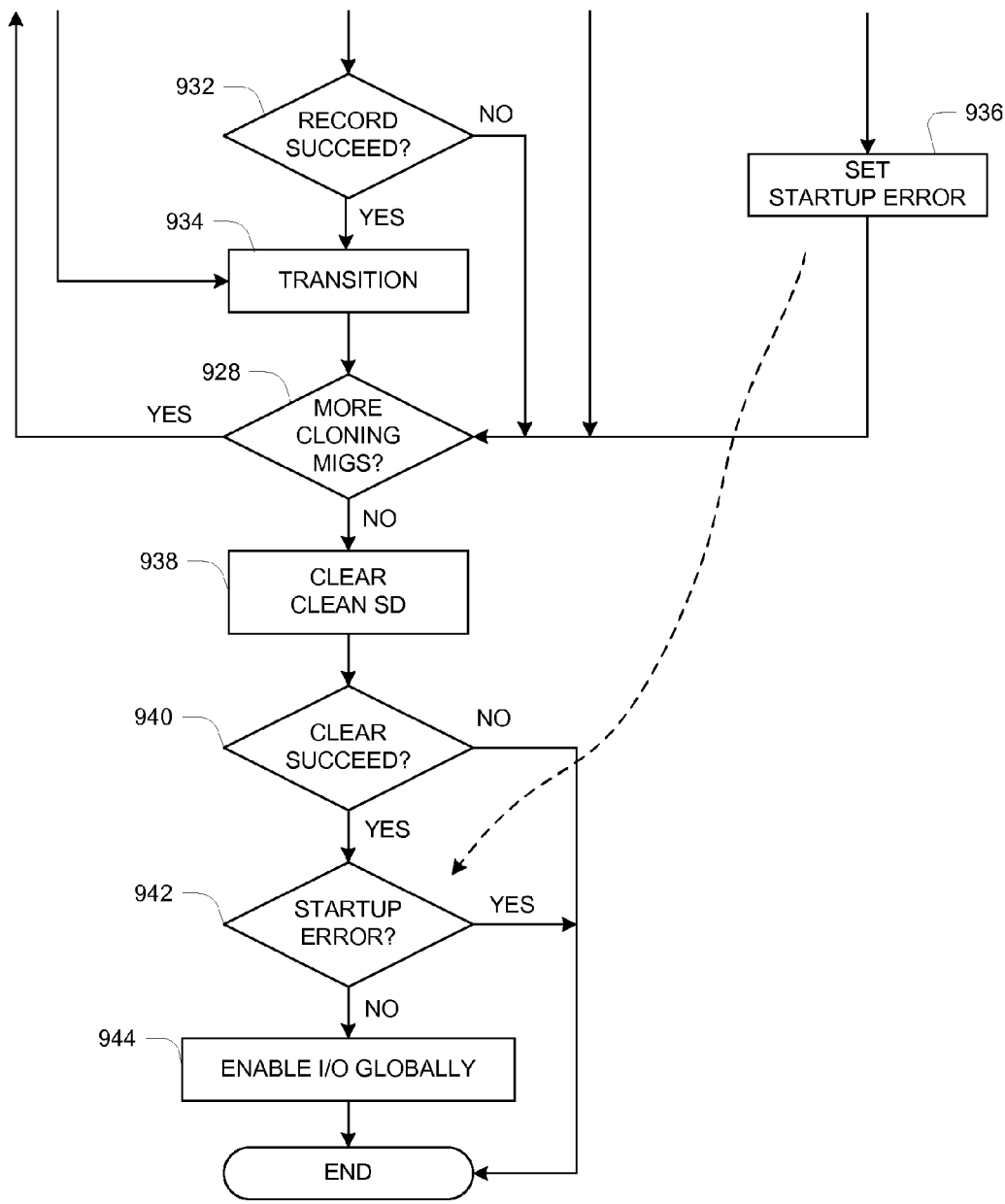
FIG. 9, consisting of views 9A and 9B, is flow diagram for a user-space startup procedure.

FIG. 9 is a flow diagram of an example method 900 that may be performed as a user-space part of the startup procedure 415 of FIGS. 4A and 4B. At 910 it enters a loop repeated for each cloning migration. At 912 it examines the UMD 330 for a recorded fault, and if none is found then at 914 it examines the KMD 370 for a recorded fault. If none is found, then at 916 I/O is suspended, and at 918 it is determined whether the kernel has detected a fault (a situation that may occur in the Windows environment but not in Unix, for example). If so, then at 920 the fault from the kernel is recorded in the KMD 370. Otherwise, at 922 the DevY ERROR flag is set in the KMD 370. In either case, at 924 is a test whether the recording succeeded, and if so then on a Windows machine another test is performed at 926 whether writes are disabled, which would be the case if the clean shutdown test 824 of FIG. 8 had failed (see above). Assuming a clean shutdown and that writes are enabled, then the process proceeds to a test 928 for more cloning migrations, and loops back to 910 to process the next one. On a Unix machine the process proceeds directly to step 928 from the "yes" decision of 924.

The rationale for the machine-type dependence is as follows. On Windows the system can crash after clearing the global clean shutdown flag in the KMD and enabling writes globally, but before re-setting the per-migration error flags. If this occurs, then the system starts with the per-migration flag indicating a clean shutdown, but it is not safe to continue without recording a fault. The writes-disabled check in 926 (after seeing no fault in KMD) serves as an indication of such a crash, and is used to record a fault in the UMD.

On Unix, writes will always be disabled at this point, but it is safe to continue without recording a fault because writes were not enabled at the time of the crash if the per migration error flag indicates a clean shutdown.

If at 926 it is determined that writes are disabled, indicating a non-clean shutdown, then at 930 a fault is recorded in the UMD 330. At 932 is a test whether this recording is successful, and if so then at 934 the migration is transitioned if possible, in the same manner as discussed above (abort or commit, depending on which side is selected and the location of the fault). Upon completion of the transition, or if the recording failed at 932, the process proceeds to the test for more migrations at 928.

Referring again to the test 924, if either recording 922 or 920 fails, then at 936 a "startup error" flag is set that will be used at a later time in the process, similar to the "record failed" flag discussed above. Then the process proceeds to the test at 928 for more migrations.

Referring again to the tests at 912 and 914, if a fault is indicated in the UMD 330 (step 912), then the process proceeds directly to the transition step 934. If a fault is indicated in the KMD 370 (step 914), then the process proceeds to 930 to record the fault in the UMD 330 and continue processing from there as described above.

When the test at 928 fails because the last cloning migration has been processed, then at 938 the clean shutdown flag is cleared, and at 940 is a test whether the clearing was successful. If not, the process ends leaving I/O disabled. This also occurs if the clearing was successful but a test at 942 finds the startup error flag (from 936) to be set. If the clearing succeeds and the startup error flag is not set, then at 944 I/O is enabled globally if not already enabled, and the process completes.

In one embodiment, the transition at 934 may be performed as a step-saving measure for the user. In other embodiments, it may be omitted, leaving the transition to be made at a later time in the user's control of the migration. The user will become aware of the fault, and any user-initiated state transitions will only be allowed insofar as consistent with limitations such as those of Table 2. Thus, the user may manually direct a transition back to the setup state 220 or to the committed state 250 based on the current state of the migration, as discussed above.

Figure 10:
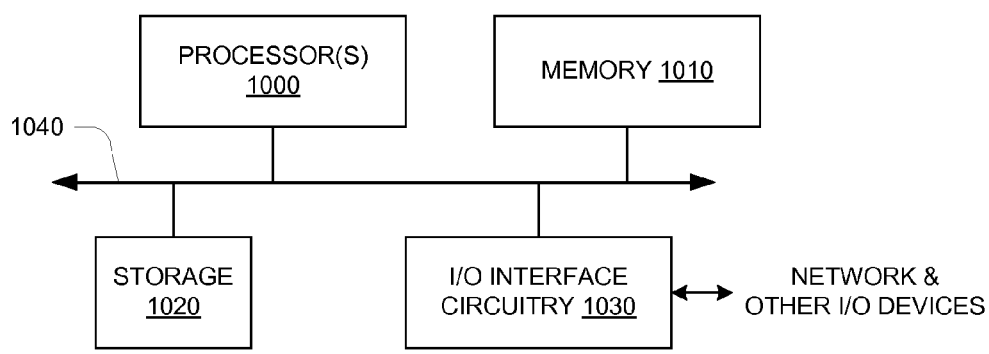
FIG. 10 is a block diagram of a computer.

FIG. 10 is a generalized depiction of a computer such as may be used to realize the host 120. It includes one or more processors 1000, memory 1010, local storage 1020 and input/output (I/O) interface circuitry 1030 coupled together by one or more data buses 1040. The I/O interface circuitry 1030 couples the computer to one or more external networks, additional storage devices or systems, and other input/output devices as generally known in the art, and as specifically shown in FIG. 1 for example. System-level functionality of the computer is provided by the hardware executing computer program instructions (software), typically stored in the memory 1010 and retrieved and executed by the processor(s) 1000. Any description herein of a software component performing a function is to be understood as a shorthand reference to operation of a computer or computerized device when executing the instructions of the software component. Also, the collection of components in FIG. 10 may be referred to as "processing circuitry", and when executing a given software component may be viewed as a function-specialized circuit, for example as a "migration circuit" when executing a software component implementing a migration function. It will be appreciated that one or more system components may have more specialized hardware organizations providing specialized functions as generally known in the art.

One of ordinary skill in the art will appreciate that other variations of the above-described processes are within the scope of the present invention. For example, in a situation in which host 120 crashes in a source selected state and then reboots at the direction of boot device 110, target device 140 will be faulted and the user will be required to remain in the source selected state until the migration has been aborted. However, in an another embodiment, when host 120 reboots, host 120 may optionally attempt to write to target device 140 to determine whether the assumption that the target had failed was correct. If a write to target device 140 fails, then host 120 may conclude that the assumption was correct. In yet other implementations, after a fault has occurred, the user may optionally decide whether or not it is necessary to abort the migration. That is, instead of being required to abort the migration as discussed above, the user may have the option to "pause" the migration in order to remedy the fault and subsequently restart the migration. In other embodiments, when an input/output error occurs, irrespective of the device on which the error occurred, the unselected device may be faulted. According to yet another embodiment, after a fault, a user may decide which side of a migration to fault. According to still yet another embodiment, kernel metadata may be writable by the kernel.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, the described implementations include software, but systems and methods consistent with the present invention may be implemented as a combination of hardware and software or in hardware alone. Examples of hardware include computing or processing systems, including personal computers, servers, laptops, mainframes, micro-processors and the like. Additionally, although aspects of the invention are described for being stored in memory, one skilled in the art will appreciate that these aspects can also be stored on other types of non-transitory computer-readable storage media, such as secondary storage devices, for example, hard disks, floppy disks, or CD-ROM, or other forms of RAM or ROM.

Computer programs based on the written description and methods are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or browser software.

While various embodiments of the invention have been particularly shown and described, it will be understood by those skilled in the art that various changes in form and details may be made therein without departing from the scope of the invention as defined by the appended claims.

What is claimed is:

1. A method of managing state transitions in a data migration operation, the migration operation including an initial setup state, a set of write cloning states in which a target storage device is becoming or is maintained synchronized with a source storage device, and a later committed state in which the target storage device is used to the exclusion of the source storage device, the set of write cloning states spanning a system shutdown/startup cycle, comprising:

upon entering the write cloning states, setting an error flag used to protect against data corruption in the event of a non-clean system shutdown;

during the write cloning states, performing only allowed state transitions based on recorded device faults, the allowed state transitions including a non-error transition to the committed state when no device fault is recorded for the target storage device and an error transition to the setup state when a device fault is recorded for the target storage device;

in the event of a clean system shutdown, completing a shutdown procedure in which a device fault detected during writing to the target storage device is recorded and the error flag is cleared, the recording of the device fault forcing the error transition of the migration operation during subsequent operation after system startup; and during the system startup prior to enabling application input/output to the target storage device, determining whether the error flag is set indicating that the shutdown procedure was not completed, and only if the error flag is set then recording a device fault for the target storage device to force the error transition of the migration operation during subsequent operation.

2. A method according to claim 1, wherein the write cloning states include a source selected state in which application reads are directed to the source storage device, and wherein the device fault for the target storage device is recorded based on the migration operation being in the source selected state during the system startup.

3. A method according to claim 1, wherein;
the write cloning states include a target selected state in which application reads are directed to the target storage device;
the device fault for the target storage device is recorded, and the error transition is a first error transition made, based on the migration operation not being in the target selected state during the system startup; and
the allowed state transitions further include a second error transition to the committed state when a device fault is recorded for the source storage device;
and further including, during the system startup if the error flag is set and the migration operation is in the target selected state, recording a device fault for the source storage device to force the second error transition of the migration operation during subsequent operation.

4. A method according to claim 1, wherein the write cloning states include a source selected state in which application reads are directed to the source storage device and a target selected state in which application reads are directed to the target storage device, and the allowable transitions include transitions between the source selected state and the target selected state in the absence of device faults for the source and target storage devices, and wherein the device fault for the target storage device is recorded as a fault to the non-selected side when the migration operation is in the source selected state.

5. A method according to claim 1, further including, during the system startup after determining whether the error flag is set, setting the error flag for use in the event of another shutdown/startup cycle.

6. A method according to claim 1, performed in a computer in which application input/output is not enabled prior to commencement of user-space application execution, and wherein the startup procedure is a user-space procedure assuming no prior enablement of application input/output.

7. A method according to claim 1, performed in a computer in which application input/output is enabled prior to commencement of user-space application execution, and wherein determining whether the error flag is set and recording a device fault are performed by a kernel-space component of the startup procedure executed prior to enablement of application input/output.

8. A method according to claim 1, wherein the startup procedure includes, in the event that the error flag is set, automatically making the error transition of the migration operation prior to returning control of the migration operation to an administrative user.

9. A method according to claim 1, wherein the migration operation is one of a plurality of concurrently active migration operations, each active migration having its own respective error flag and device fault indicator, and wherein completing the shutdown procedure includes recording detected target device faults and clearing error flags of all the active migrations, and wherein the determining and recording performed during the system startup are performed for each of the active migrations.

10. A non-transitory computer readable medium having computer program instructions recorded thereon, the computer program instructions being executable by a computer to cause the computer to perform a method of managing state transitions in a data migration operation, the migration operation including an initial setup state, a set of write cloning states in which a target storage device is becoming or is maintained synchronized with a source storage device, and a later committed state in which the target storage device is used to the exclusion of the source storage device, the set of write cloning states spanning a system shutdown/startup cycle, the method including:

upon entering the write cloning states, setting an error flag used to protect against data corruption in the event of a non-clean system shutdown;

during the write cloning states, performing only allowed state transitions based on recorded device faults, the allowed state transitions including a non-error transition to the committed state when no device fault is recorded for the target storage device and an error transition to the setup state when a device fault is recorded for the target storage device;

in the event of a clean system shutdown, completing a shutdown procedure in which a device fault detected during writing to the target storage device is recorded and the error flag is cleared, the recording of the device fault forcing the error transition of the migration operation during subsequent operation; and during the system startup prior to enabling application input/output to the target storage device, determining whether the error flag is set indicating that the shutdown procedure was not completed, and only if the error flag is set then recording a device fault for the target storage device to force the error transition of the migration operation during subsequent operation.

11. A non-transitory computer readable medium according to claim 10, wherein the write cloning states include a source selected state in which application reads are directed to the source storage device, and wherein the device fault for the target storage device is recorded based on the migration operation being in the source selected state during the system startup.

12. A non-transitory computer readable medium according to claim 10, wherein;
the write cloning states include a target selected state in which application reads are directed to the target storage device;
the device fault for the target storage device is recorded, and the error transition is a first error transition made, based on the migration operation not being in the target selected state during the system startup; and
the allowed state transitions further include a second error transition to the committed state when a device fault is recorded for the source storage device;

and wherein the method further includes, during the system startup if the error flag is set and the migration operation is in the target selected state, recording a device fault for the source storage device to force the second error transition of the migration operation during subsequent operation.

13. A non-transitory computer readable medium according to claim 10, wherein the write cloning states include a source selected state in which application reads are directed to the source storage device and a target selected state in which application reads are directed to the target storage device, and the allowable transitions include transitions between the source selected state and the target selected state in the absence of device faults for the source and target storage devices, and wherein the device fault for the target storage device is recorded as a fault to the non-selected side when the migration operation is in the source selected state.

14. A non-transitory computer readable medium according to claim 10, wherein the method further includes, during the system startup after determining whether the error flag is set, setting the error flag for use in the event of another shutdown/startup cycle.

15. A non-transitory computer readable medium according to claim 10, wherein the computer is a type in which application input/output is not enabled prior to commencement of user-space application execution, and wherein the startup procedure is a user-space procedure assuming no prior enablement of application input/output.

16. A non-transitory computer readable medium according to claim 10, wherein the computer is a type in which application input/output is enabled prior to commencement of user-space application execution, and wherein determining whether the error flag is set and recording a device fault are performed by a kernel-space component of the startup procedure executed prior to enablement of application input/output.

17. A non-transitory computer readable medium according to claim 10, wherein the startup procedure includes, in the event that the error flag is set, automatically making the error transition of the migration operation prior to returning control of the migration operation to an administrative user.

18. A non-transitory computer readable medium according to claim 10, wherein the migration operation is one of a plurality of concurrently active migration operations, each active migration having its own respective error flag and device fault indicator, and wherein completing the shutdown procedure includes recording detected target device faults and clearing error flags of all the active migrations, and wherein the determining and recording performed during the system startup are performed for each of the active migrations.

* * * * *